(12) United States Patent
Park et al.

(10) Patent No.: US 7,215,561 B2
(45) Date of Patent: May 8, 2007

(54) SEMICONDUCTOR MEMORY SYSTEM HAVING MULTIPLE SYSTEM DATA BUSES

(75) Inventors: Myun-Joo Park, Incheon (KR); Byung-Se So, Sungnam (KR); Jae-Jun Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 153 days.

(21) Appl. No.: 10/644,735

(22) Filed: Aug. 21, 2003

(65) Prior Publication Data
US 2004/0037133 A1 Feb. 26, 2004

(30) Foreign Application Priority Data
Aug. 23, 2002 (KR) ................ 10-2002-0050172

(51) Int. Cl.
*G11C 5/00* (2006.01)
*G11C 8/00* (2006.01)
(52) U.S. Cl. ............... 365/52; 365/230.03; 711/5
(58) Field of Classification Search .......... 365/51, 365/52, 63, 230.03, 239, 201, 230.06, 189.02, 365/203.03; 711/5
See application file for complete search history.

(56) References Cited

U.S. PATENT DOCUMENTS

| | | | |
|---|---|---|---|
| 4,884,237 A * | 11/1989 | Mueller et al. ........... 365/63 |
| 4,916,603 A * | 4/1990 | Ryan et al. .......... 365/230.03 |
| 5,909,557 A | 6/1999 | Betker et al. |
| 5,963,464 A * | 10/1999 | Dell et al. .............. 365/52 |
| 6,233,650 B1 * | 5/2001 | Johnson et al. ....... 365/189.02 |
| 6,253,284 B1 * | 6/2001 | Hsu ...................... 365/63 |
| 6,349,050 B1 * | 2/2002 | Woo et al. ............... 365/51 |
| 6,414,904 B2 * | 7/2002 | So et al. ................ 365/239 |
| 6,438,014 B2 * | 8/2002 | Funaba et al. ............ 365/63 |
| 6,438,015 B2 * | 8/2002 | Kyung ................... 365/63 |
| 6,466,472 B1 * | 10/2002 | Lin ....................... 365/63 |
| 6,466,496 B2 * | 10/2002 | Kuge .................... 365/201 |
| 6,545,895 B1 * | 4/2003 | Li et al. .................. 365/52 |
| 6,594,167 B1 * | 7/2003 | Yamasaki et al. ......... 365/63 |
| 6,625,687 B1 * | 9/2003 | Halbert et al. ............ 365/63 |

(Continued)

FOREIGN PATENT DOCUMENTS

JP 11-259417 9/1999

(Continued)

*Primary Examiner*—Trong Phan
(74) *Attorney, Agent, or Firm*—Volentine & Whitt, PLLC

(57) ABSTRACT

The semiconductor memory system includes a memory controller, N system data buses, and first through P-th memory module groups. The N system data buses are connected to the memory controller and respectively have a width of M/N bits. The first through P-th memory module groups are connected to the N system data buses and respectively have N memory modules. In each of the first through P-th memory module groups, a different one of the N system data buses is connected to each of the N memory modules, and each of the N system data buses has a data bus width of M/N bits. The first through P-th memory module groups are operated in response to first through P-th corresponding chip select signals. M is the bit-width of an entire system data bus of the semiconductor memory system. The N system data buses are wired such that data transmission times are the same from each N memory modules that operate in response to the same chip select signal to the memory controller.

22 Claims, 6 Drawing Sheets

U.S. PATENT DOCUMENTS

| | | | |
|---|---|---|---|
| 6,658,530 B1 * | 12/2003 | Robertson et al. | 365/52 |
| 6,661,690 B2 * | 12/2003 | Moriarty et al. | 365/63 |
| 6,662,266 B2 * | 12/2003 | Ryan | 711/5 |
| 6,683,372 B1 * | 1/2004 | Wong et al. | 257/686 |
| 6,714,433 B2 * | 3/2004 | Doblar et al. | 365/51 |
| 6,747,887 B2 * | 6/2004 | Halbert et al. | 365/52 |
| 6,771,526 B2 * | 8/2004 | LaBerge | 365/63 |
| 6,826,067 B2 * | 11/2004 | Yang | 365/63 |
| 6,972,981 B2 * | 12/2005 | Ruckerbauer et al. | 365/63 |

FOREIGN PATENT DOCUMENTS

| | | |
|---|---|---|
| JP | 2002-41444 | 2/2002 |

* cited by examiner

SEMICONDUCTOR MEMORY SYSTEM HAVING MULTIPLE SYSTEM DATA BUSES

BACKGROUND OF THE INVENTION

1. Field of the Invention

The present invention generally relates to the field of semiconductor memory systems, and more particularly, the present invention relates to a semiconductor memory system having multiple system data buses.

A claim of priority is made to Korean Patent Application No. 2002-50172, filed on Aug. 23, 2002, in the Korean Intellectual Property Office, the disclosure of which is incorporated herein in its entirety by reference.

2. Description of the Related Art

Memory devices have been developed with emphasis on the realization of high degrees of integration and large memory capacities. Central processing units (CPUs), on the other hand, have been developed with emphasis on achieving high processing speeds. As a result, the difference in operating speeds between CPUs and memory devices has been gradually increasing. As such, the operating speed of the computer system memory device has become a chief factor limiting the performance of the computer system itself.

FIG. 1 is a block diagram of the structure of a conventional semiconductor memory system.

A system data bus having a width of M bits connects memory modules 120, 130, 140, and 150 to a memory controller 110. The memory modules 120, 130, 140, and 150 are installed in respective memory slots (not shown). The memory modules 120, 130, 140, and 150 have the same data bus width as the system data bus. Each of the memory slots is commonly connected to the system data bus.

Also, all of the memory slots are sequentially connected to the system data bus. Thus, in large-capacity memory systems, as the number of memory slots increases, channel discontinuity in the system data bus line and impedance mismatch increase. Hence, the operating characteristics of the system data bus are deteriorated in a high frequency region, thus limiting the operation speed of the system.

Large-capacity memory devices are essential for, in particular, the operation of a high-performance, large-capacity server system. In order to maximize the capacity of a memory system, the number of memory devices installed in the memory system should be maximized. For this purpose, the number of memory slots accommodating memory modules should be increased, and the number of memory devices per memory module should be maximized.

On the other hand, for high-speed operation of the memory system, an impedance mismatch factor of the system data bus or load of the system data bus caused by the memory devices should be minimized. In order to meet these requirements for high-speed operation, both the number of memory slots connected to a channel and the number of memory modules should be small.

Thus, a conflict exists between maximizing the number of memory devices to achieve a large memory capacity and minimizing the number of memory devices to achieve a high-speed operation. It is therefore difficult to simultaneously achieve both a large memory capacity and a high-speed operation.

SUMMARY OF THE INVENTION

According to an aspect of the present invention, there is provided a semiconductor memory system. The semiconductor memory system includes a memory controller, N system data buses (where N is a natural number of 2 or more), and first through P-th memory module groups (where P is a natural number).

The N system data buses are connected to the memory controller, and each of the N system data buses has a width of M/N bits (where M is a natural number). The first through P-th memory module groups are connected to the N system data buses, and each of the first through P-th memory module groups has N memory modules.

In each of the first through P-th memory module groups, a different one of the N system data buses is connected to each of the N memory modules.

The first through P-th memory module groups are operated in response to first through P-th corresponding chip select signals.

M is the bit-width of an entire system data bus of the semiconductor memory system. The N system data buses are wired such that data transmission times are the same from each N memory modules that operate in response the same chip select signal to the memory controller.

L memory devices may be installed in each of the memory modules, with each of the L memory devices has a bus width of M/(N*L) bits.

Alternately, the L memory devices installed in each of the memory modules may be divided into N banks, with each of the L memory devices having a bus width of M/L bits. Each of the N banks shares a data bus of M/N bits and is separately operated in response to the first through P-th corresponding chip select signals.

According to another aspect of the present invention, there is provided a semiconductor memory system. The semiconductor memory system includes a memory controller, N system data buses (where N is a natural number of 2 or more), a first memory module group, and a second memory module group.

The N system data buses are connected to the memory controller, and each of the N system data buses has a width of M/N bits (where M is a natural number). The first memory module group is connected to the N system data buses, having N memory modules. The second memory module group is connected to the N system data buses, having one or more memory modules.

In the first memory module group, a different one of the N system data buses is connected to each memory module, has a data bus width of M/N bits and is operated in response to the same chip select signal.

In the second memory module group, all of the N system data buses are connected to each memory module, each of the N system data buses has a data bus width of M bits, and each memory module is operated in response to a separate chip select signal.

M is the bit-width of an entire system data bus of the semiconductor memory system. The N system data buses are wired such that data transmission times are the same from each N memory modules that operate in response the same chip select signal to the memory controller.

L memory devices may be installed in each of the memory modules, with each of the L memory devices has a bus width of M/(N*L) bits.

Alternately, the L memory devices installed in each of the memory modules may be divided into N banks, with each of the L memory devices having a bus width of M/L bits. Each of the N banks shares a data bus of M/N bits and is separately operated in response to the first through P-th corresponding chip select signals.

According to another aspect of the present invention, there is provided a semiconductor memory system which employs a serial link bus system. The system includes a memory controller, N system data buses, and first through P-th memory module groups.

The N system data buses are connected to the memory controller, and each of the N system data buses has a width of M/N bits. The first through P-th memory module groups are connected to the N system data buses, and each of the first through P-th memory module groups has N memory modules. In each of the first through P-th memory module groups, a different one of the N system data buses is connected to each of the N memory modules, and each of the N system data buses has a data bus width of M/N bits and includes data buffers for data transmission. The first through P-th memory module groups are operated in response to first through P-th corresponding chip select signals, and each of the memory modules connected to a common system data bus transmits data using the data buffers.

M is the bit-width of an entire system data bus of the semiconductor memory system. The N system data buses are wired such that data transmission times are the same from N memory modules that operate in response the same chip select signal to the memory controller.

L memory devices may be installed in each of the memory modules, with each of the L memory devices has a bus width of M/(N*L) bits.

Alternately, the L memory devices installed in each of the memory modules may be divided into N banks, with each of the L memory devices having a bus width of M/L bits. Each of the N banks shares a data bus of M/N bits and is separately operated in response to the first through P-th corresponding chip select signals.

BRIEF DESCRIPTION OF THE DRAWINGS

The above and other aspects and advantages of the present invention will become more apparent from the detailed description that follows, with reference to the accompanying drawings, in which.

DETAILED DESCRIPTION OF THE PREFERRED EMBODIMENTS

Figure 1:
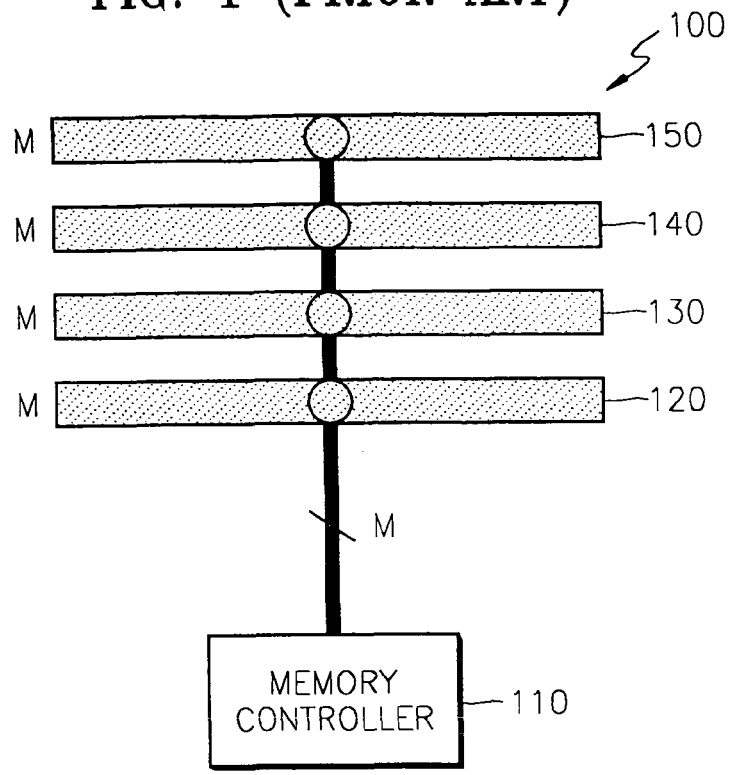
FIG. 1 is a block diagram of the structure of a conventional semiconductor memory system.

Hereinafter, preferred embodiments of the present invention will be described in detail with reference to the accompanying drawings. Like reference numerals refer to like elements throughout the drawings.

FIGS. 2A through 2D are block diagrams of semiconductor memory systems according to a first embodiment of the present invention. FIGS. 3A and 3B illustrate alternative memory modules which may be used in the systems of FIGS. 2A through 2D.

Figure 2A:
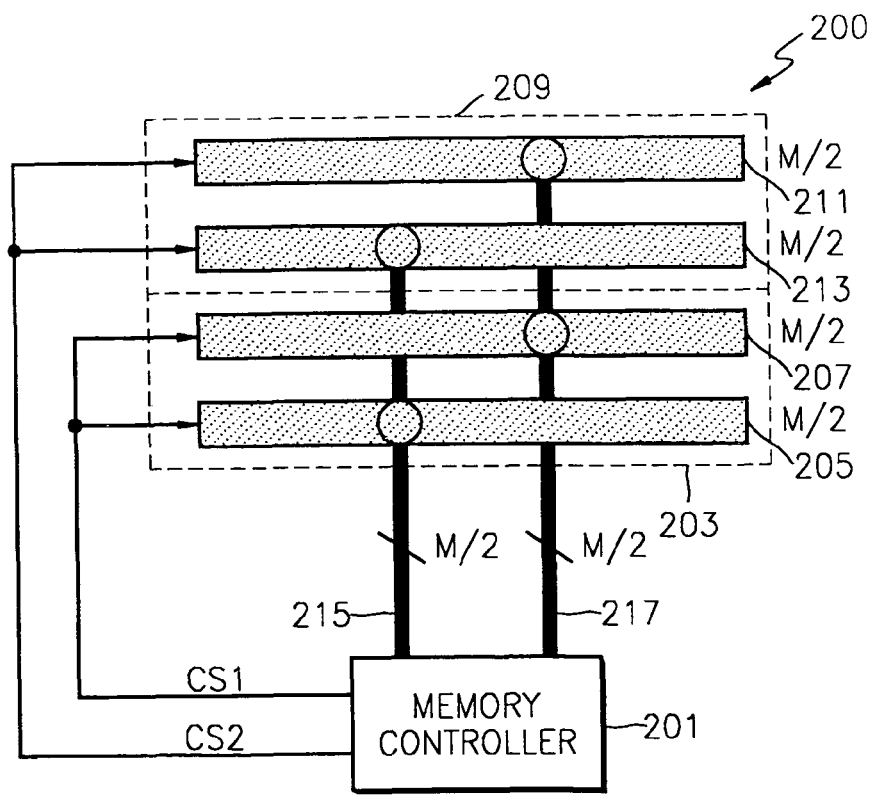
FIGS. 2A through 2D are block diagrams of semiconductor memory systems according to a first embodiment of the present invention.
Figure 3A:
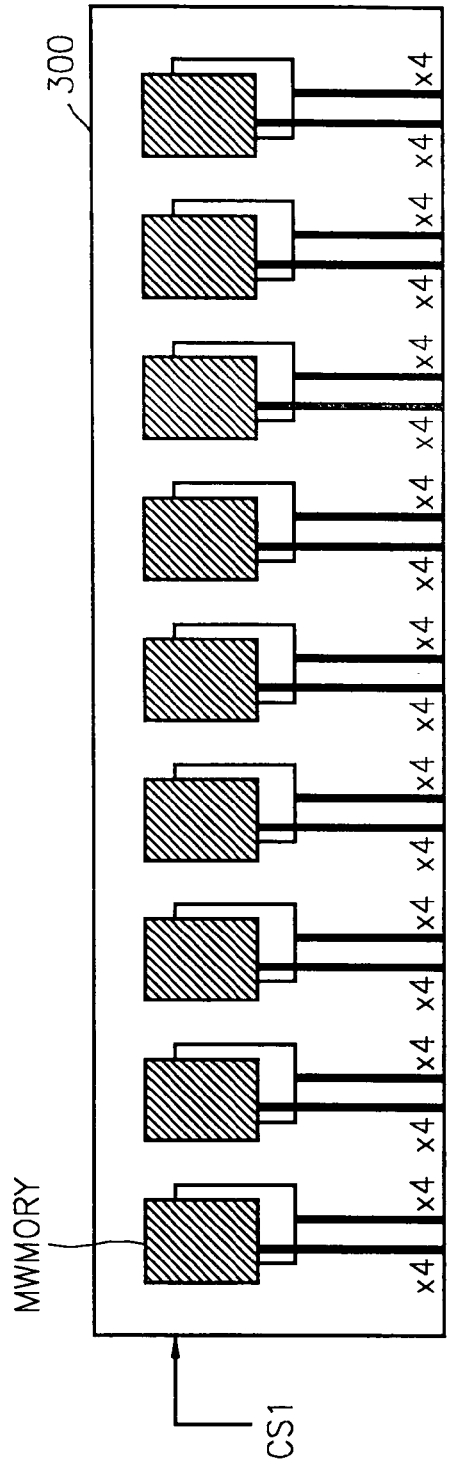
FIGS. 3A and 3B illustrate alternative memory modules which may be used in the systems of FIGS. 2A through 2D.
Figure 3B:
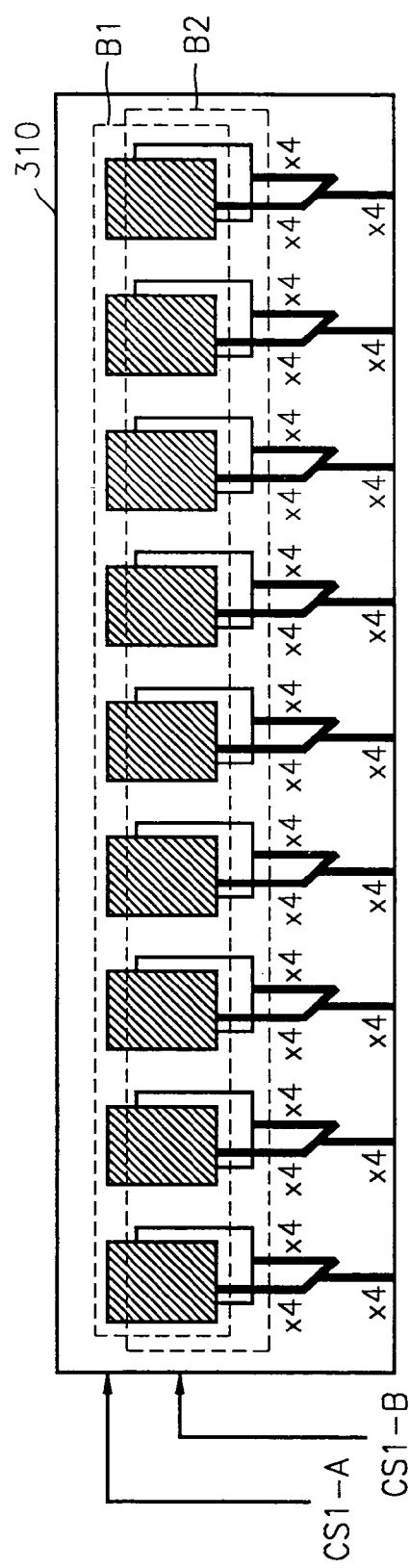

Referring to FIG. 2A, a semiconductor memory system 200 according to the first embodiment of the present invention includes a memory controller 201, N system data buses 215 and 217, and first through P-th memory module groups 203 and 209.

An M-bit bus system is defined by N system data buses 215 and 217 connected to the memory controller 201, where each of the N system data buses 215 and 217 has a width of M/N bits. Here, M is the width of an entire system data bus of the semiconductor memory system 200. The N system data buses 215 and 217 are wired such that data transmission times to the memory controller 201 from those of N memory modules 205, 207, 211, and 213 that operate in response to the same chip select signal CS1 or CS2 are the same. In this example, N is 2. That is, there are two system data buses 215 and 217.

The first through P-th memory module groups 203 and 209 are connected to the system data buses 215 and 217. Further, each group 203 and 209 includes N memory modules 205 and 207, and 211 and 213, respectively. Within each of the first through P-th memory module groups 203 and 209, each of the memory modules 205 and 207, and 211 and 213 is connected to a different one of the system data buses 215 and 217. In this example, P is 2. That is, there are first and second memory module groups 203 and 209. The first through P-th memory module groups 203 and 209 are operated in response to first through P-th chip select signals CS1 and CS2.

The memory modules 205, 207, 211, and 213 of FIG. 2A may be configured as shown in FIG. 3A or as shown in FIG. 3B.

In the case of FIG. 3A, L memory devices are installed in the memory modules 300, with each of the L memory devices having a data bus width of M/(N*L) bits. The L memory devices are operated in response to a chip selection signal CS1.

Alternatively, referring to FIG. 3B, the L memory devices installed in the memory module 310 are divided into N banks B1 and B2, with each of the L memory devices having a data bus width of M/L bits. Each of the N banks B1 and B2 shares a data bus of M/N bits and is separately operated in response to a corresponding one of chip select signals CS1_A and CS1_B. The chip select signals CS1_A and CS1_B are respectively applied to the N banks B1 and B2.

The N system data buses 215 and 217 of the semiconductor memory system 200 of FIG. 2A are connected to the memory controller 201, and each of the N system data buses 215 and 217 has a width of M/N bits. In this example, N is 2, and therefore two system data buses 215 and 217 are shown in FIG. 2A. However, N may be more than 2.

Also, M is the bit-width of an entire system data bus of the semiconductor memory system 200. Since the width of the entire system data bus is M bits, each of the system data buses 215 and 217 has a width of M/2 bits. For example, in the case where the semiconductor memory system 200 includes three system data buses, each of the system data buses has a data width of M/3 bits.

The first through P-th memory module groups 203 and 209 are connected to the system data buses 215 and 217. The memory module group 203 includes the N memory modules 205 and 207, and the memory module group 209 includes the N memory modules 211 and 213. In the first embodiment, P is 2, and accordingly, there are the first and second memory module groups 203 and 209. However, P is not limited to 2.

In the first memory module group 203, a different one of the system data buses 215 and 217 is connected to each of the memory modules 205 and 207, and in the second memory module group 209, a different one of the system data buses 215 and 217 is connected to each of the memory modules 211 and 213. As stated previously, each of the system data buses 215 and 217 has a data bus width of M/N bits. Therefore, each of the memory modules 205, 207, 211, and 213 has a data bus width of M/2 bits.

The entire system data bus of M bits cannot be filled with one memory module, and thus is filled with N memory modules. In the present embodiment, N is 2 and thus, the entire system data bus is filled with two memory modules. The number of memory modules which can fill M bits constitutes the number of memory modules in a memory module group. Here, two memory modules can fill the width of the system data bus of M bits, and thus, each memory module group has two memory modules.

Memory modules belonging to the same memory module group are simultaneously operated in response to the same chip select signal In this embodiment, the first through P-th memory module groups 203 and 209 are operated in response to the first through P-th chip select signals CS1 and CS2, respectively.

The N system data buses 215 and 217 are wired such that data transmission times are the same to the memory controller 201 from those of N memory modules 205, 207, 211, and 213 that operate in response the same chip select signal CS1 or CS2. That is, since the memory module 205 is closer to the memory controller 201 than the memory module 207, a data transmission time from the memory module 205 to the memory controller 201 may be different than that from the memory module 207 to the memory controller 201. However, by deliberately increasing the length of the wiring of the system data bus 215 from the memory module 205 to the memory controller 201, data transmission times from the two memory modules 205 and 207 to the memory controller 201 can be made the same.

Figure 2B:
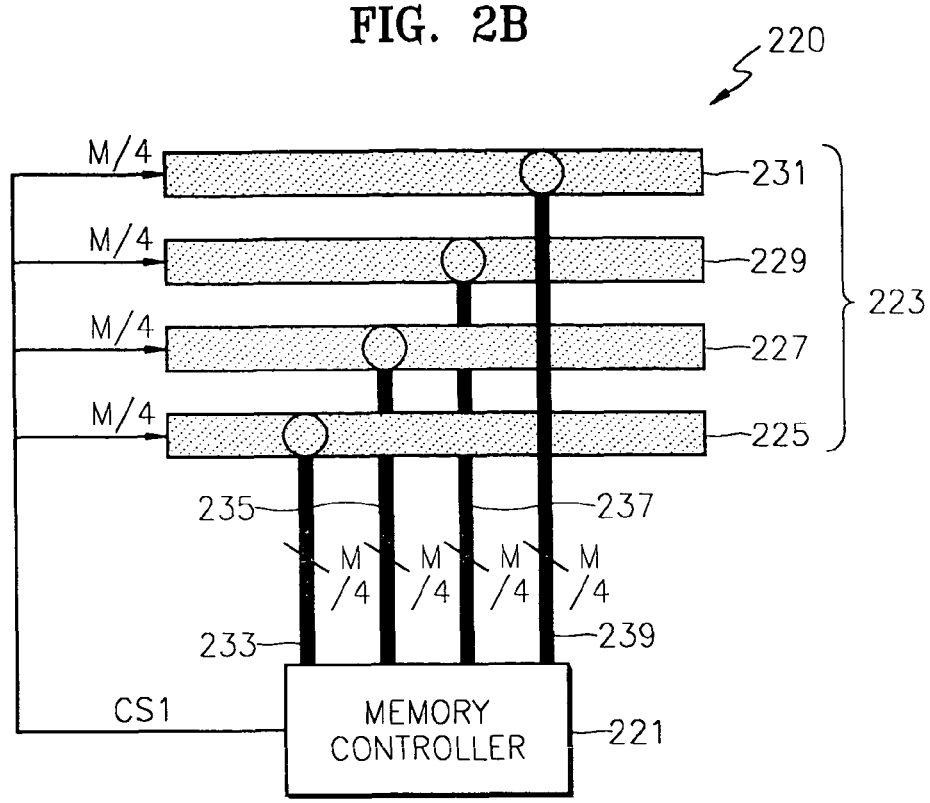
Figure 2C:
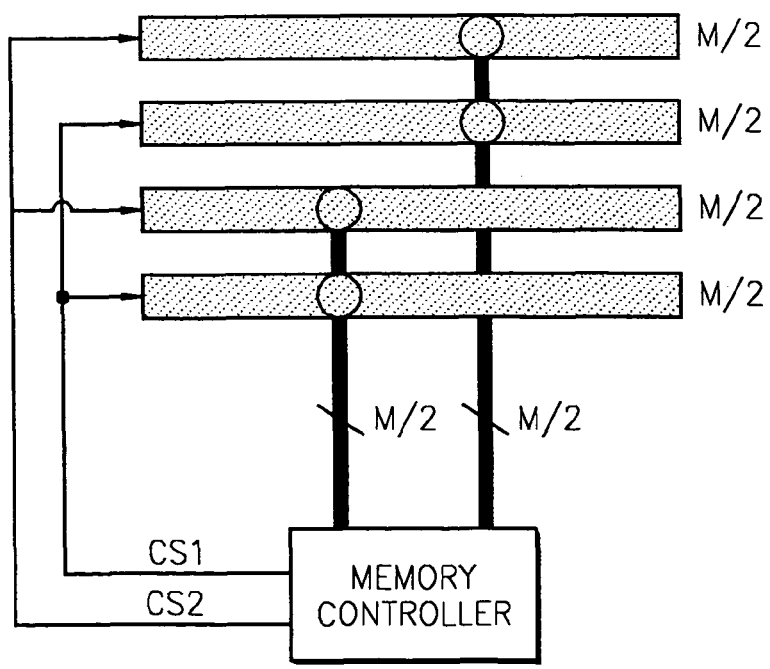
Figure 2D:
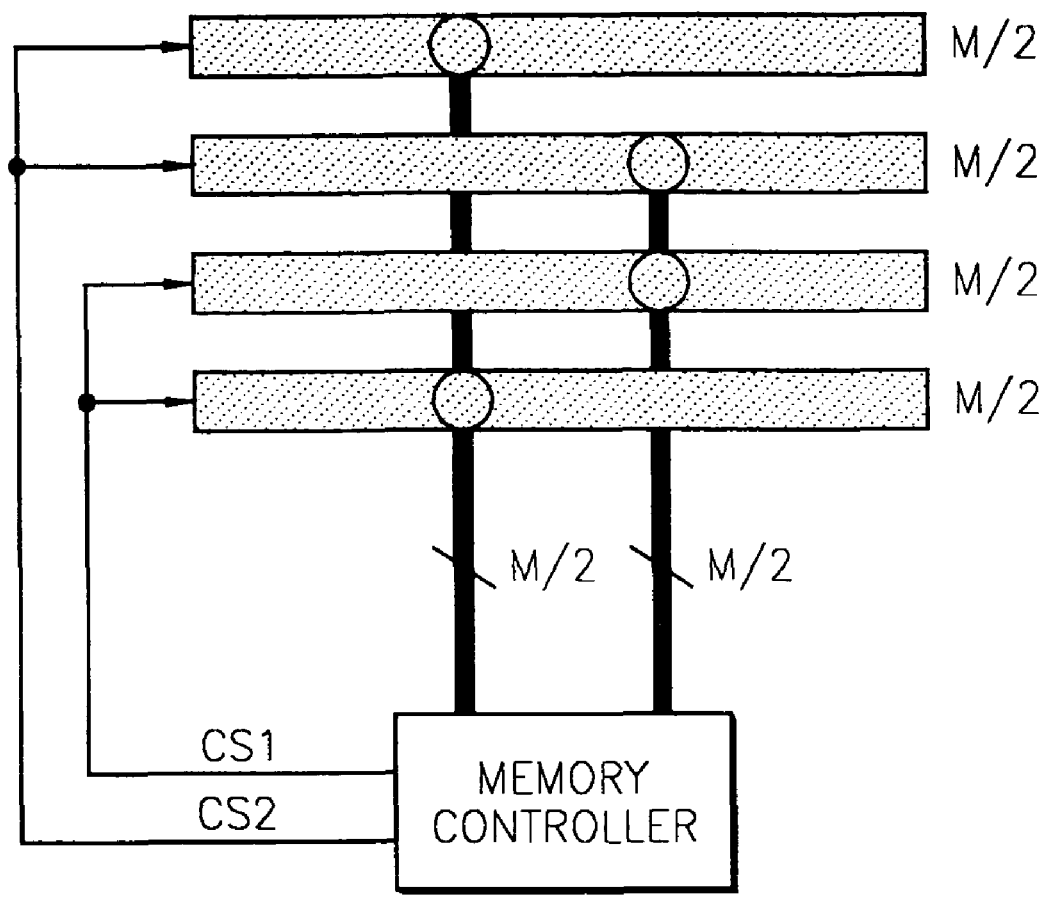

The semiconductor memory system 220 of FIG. 2B employs another arrangement of memory modules. In the semiconductor memory system 220 of FIG. 2B, one memory module group 223 is comprised of four memory modules 225, 227, 229, and 231. That is, P is 1, and N is 4. Each of system data buses 233, 235, 237, and 239 has a width of M/4 bits. The memory modules 225, 227, 229, and 231 are simultaneously operated in response to the same chip select signal CS1. If the system data buses 233, 235, 237, and 239 are wired to the same lengths, the respective data transmission speeds from the memory modules 225, 227, 229, and 231 to the memory controller 221 can be made the same.

If system data buses from memory modules to a memory controller are wired to the same length, the memory modules may be arranged in a variety of different ways. As an example, in FIG. 2C, the first of two data buses is connected to the first two memory modules, and the second of the two data buses is connected to the second two memory modules. As another example, in FIG. 2D, the first of two data buses is connect to the first and fourth memory module, and the second of the two data buses is connected to the third and fourth memory modules.

According to the first embodiment of the present invention, by dividing the system memory bus into multiple data buses each connected a memory module contained in each memory module group, memory channel discontinuity and impedance mismatch are greatly reduced compared with the conventional semiconductor memory system 100 shown in FIG. 1.

In addition, the high-speed characteristics of the system data bus are improved, and the system data bus can operate in a high-frequency region. Further, the number of data input/output circuits that simultaneously operate in each memory module is reduced to half (or more) of their original number, such that operating power consumption per memory module is reduced. Also, radio frequency noise such as simultaneous switching noise can be reduced.

Furthermore, the number of data pins of the memory modules is reduced such that the number of pins of a memory module socket is reduced, or remaining pins may be used only to ground the memory modules and for power pins, thereby improving the characteristics of the memory modules.

Data bus widths of the memory modules 205, 207, 211, and 213 used in the first embodiment of the present invention shown in FIG. 2 can be reduced to half that of the memory modules 120, 130, 140, and 150 of the conventional semiconductor memory system 100 of FIG. 1.

For this purpose, reducing the number of memory devices of the conventional memory modules 120, 130, 140, and 150 to half of their original number is the simplest method. However, this method is not preferable because it reduces the capacity of a memory module and, consequently, of the entire semiconductor memory system.

In order to avoid these problems, one data pin is shared by two memory devices in the memory modules, and the two memory devices are operated as separate memory banks.

That is, the data bus width of the memory modules according to the present invention is reduced to half of the data bus width of the conventional memory modules, but the number of memory banks is increased to twice the number of memory banks of the conventional art. In this way, memory capacity can be maintained the same as in the conventional art, and simultaneously, the above-described advantages of the system data bus according to the present invention shown in FIG. 2A can be realized.

The memory module 300 of FIG. 3A is a conventional memory module. The memory module 300 includes eighteen memory devices. For example, if the memory module 300 has a 72-bit data bus, each of the memory devices has a 4-bit data bus. The memory devices are simultaneously operated in response to the chip select signal CSI.

The memory module 310 of FIG. 3B is a memory module according to the present embodiment. L memory devices are installed in the memory module 310. The L memory devices are divided into N banks B1 and B2, and each of the N banks B1 and B2 has L/N memory devices.

The memory module 310 preferably has a 36-bit data bus. Similarly, the memory module 310 includes eighteen memory devices, like the conventional memory module 300. That is, L is 18. Here, N is 2. Thus, the memory module 310 includes two memory banks B1 and B2, and each of the two memory banks B1 and B2 has nine memory devices.

Each of the two memory banks B1 and B2 shares a 36-bit data bus of the memory module 310 and is separately operated in response to a corresponding one of chip select signals CS1_A and CS1_B. The chip select signal CS1_A is applied to the bank B1, and the chip select signal CS1_B is applied to the bank B2. Each of the eighteen memory devices has a data bus width of 4 bits.

If the bank B1 is selected in response to the chip select signal CS1_A, the nine memory devices of the bank B1 transmit data to a memory controller using the 36-bit data bus. In this case, the bank B2 is not operated. If the bank B2 is selected in response to the chip select signal CS1_B, the nine memory devices of the bank B2 transmit data to the memory controller using the 36-bit data bus. In this case, the bank B1 is not operated.

In this way, memory capacity can be maintained the same as in the conventional semiconductor memory system, and simultaneously, the advantages of the present invention described previously can be realized.

If there are four system data buses like in the memory module 220 of FIG. 2B, that is, if N is 4, the number of memory devices of the memory module 220 is the same as in the conventional art, while the number of memory banks is increased four times. Memory devices belonging to four different memory banks share a data pin of a memory module. In this way, the data bus width is reduced to ¼, and simultaneously memory capacity can be maintained the same as in the conventional art.

Another method for reducing the data bus width of the memory module without reducing memory capacity is to include in memory module memory devices having a narrow data bus width. If memory devices having a data bus width half of an original data bus width are used, the data bus width of a memory module having the same number of memory devices is also reduced by half.

That is, the memory module 200 of FIG. 2A includes eighteen memory devices, and each of the eighteen memory devices has a data bus width of M/(N*L) bits, i.e., 72/(2*18) =2 bits.

In this way, a memory module whose data bus width is reduced to half of its original width and which has the same memory capacity and the same number of memory banks can be constituted.

Figure 4A:
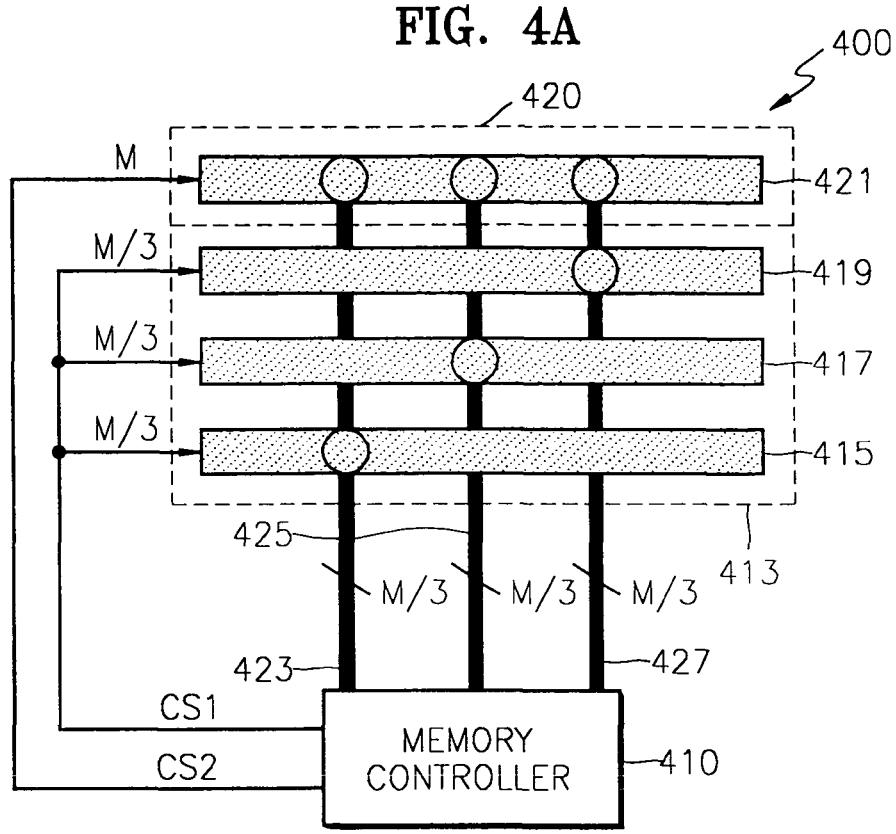
FIGS. 4A and 4B are block diagrams of semiconductor memory systems according to a second embodiment of the present invention.
Figure 4B:
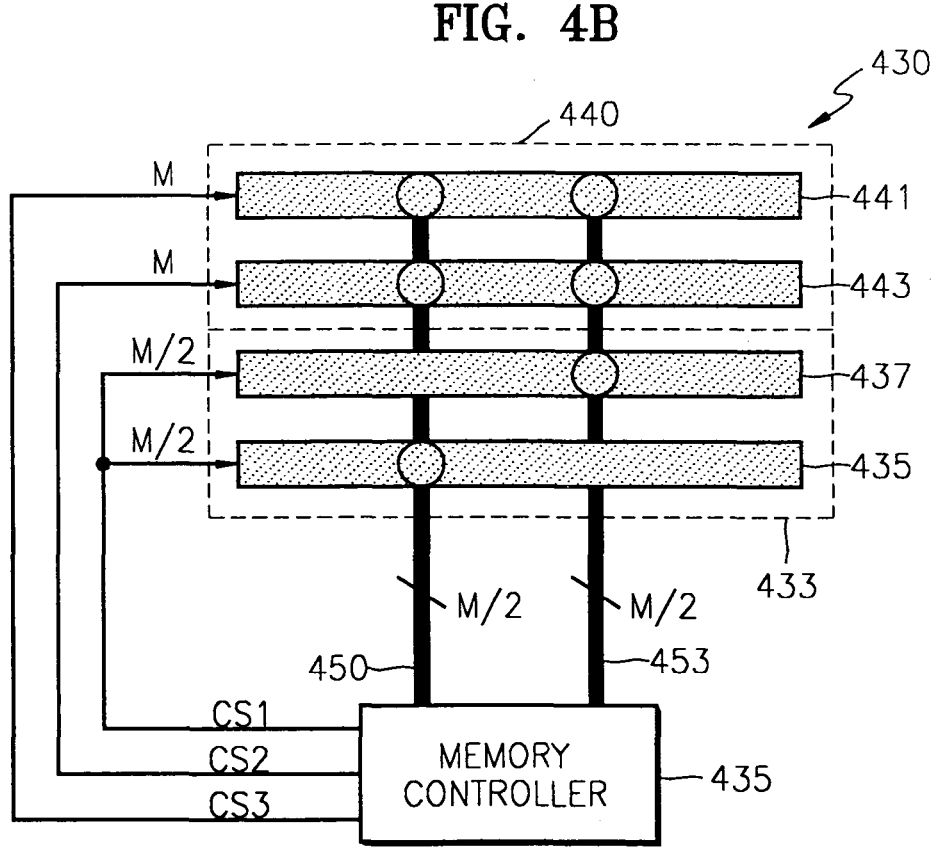

FIGS. 4A and 4B are block diagrams of a semiconductor memory system according to a second embodiment of the present invention. Referring to FIG. 4A, a semiconductor memory system 400 according to the second embodiment of the present invention includes a memory controller 410, N system data buses 423, 425, and 427, and first and second memory module groups 413 and 420.

The N system data buses 423, 425, and 427 are connected to the memory controller 410, and each of the N system data buses 423, 425, and 427 has a width of M/N bits. Here, M is the bit-width of an entire system data bus of the semiconductor memory system 400. The N system data buses 423, 425, and 427 are wired such that data transmission times from memory modules 415, 417, and 419 of the first memory module group 413 to the memory controller 410 are the same.

The first memory module group 413 is connected to the N system data buses 423, 425, and 427 and includes the N memory modules 415, 417, and 419. The second memory module group 420 is connected to the N system data buses 423, 425, and 427 and includes one or more memory modules 421.

In the first memory module group 413, a different one of the system data buses 423, 425, and 427 is connected to each of the memory modules 415, 417, and 419, and each of the system data buses 423, 425, and 427 has a data bus width of M/N bits and is operated in response to the same chip select signal CS1.

More specifically, L memory devices (not shown) are installed in the memory modules 415, 417, and 419 of the first memory module group 413. The L memory devices are divided into N banks (not shown), and each of the N banks has L/N memory devices. Each of the N banks shares a data bus of M/N bits of the memory modules 415, 417, and 419 and is separately operated in response to a corresponding chip select signal.

Each of the L memory devices has a data bus width of M/L bits.

In the memory module 421 of the second memory module group 420, the N system data buses 423, 425, and 427 are connected to the memory module 421, and each of the system data buses 423, 425, and 427 has a data bus width of M bits, and each memory module is operated in response to a separate chip select signal CS2.

L memory devices are installed in the memory modules 415, 417, and 419 of the first memory module group 413. Each of the L memory devices has a data bus width of M/(N*L) bits.

Hereinafter, the operation of the semiconductor memory system according to the second embodiment of the present invention will be described in detail with reference to FIGS. 4A and 4B.

The semiconductor memory systems 400 and 430 of FIGS. 4A and 4B according to the second embodiment of the present invention represent a case where memory modules having different data bus widths are used together.

Referring to FIG. 4A, the entire system data bus having a width of M bits is divided into the three system data buses 423, 425, and 427 having a width of M/3 bits, and there are the three memory modules 415, 417, and 419 in the first memory module group 413. Each of the three memory modules 415, 417, and 419 has a data bus width of M/3 bits. The structure and operation of the first memory module group 413 are the same as those of the semiconductor memory system according to the first embodiment of the present invention.

The second memory module group 420 is connected to the three system data buses 423, 425, and 427 and includes a memory module 421. However, the second memory module group 420 may include two memory modules 441 and 443, like a second memory module group 440 of FIG. 4B, or more than two memory modules.

The memory module 421 of the second memory module group 420 has the same data bus width of M bits as the entire system data bus and is operated in response to the chip select signal CS2.

The memory modules 415, 417, and 419 of the first memory module group 413 have the same data bus widths as the divided system data buses 423, 425, and 427, and the memory module 421 of the second memory module group 420 has the same data bus width as the data bus width of the entire system data bus.

Referring to FIG. 4B, a first memory module group 433 includes two memory modules 435 and 437 and is connected to two divided system data buses 450 and 453. The second memory module group 440 includes two memory modules 441 and 443. Each of the memory modules 441 and 443 has a data bus width of M bits and is connected to the two divided system data buses 450 and 453.

Like the semiconductor memory systems 400 and 430 according to the second embodiment of the present invention, memory modules having different data bus widths can be combined with one another in various ways, and the same effect as that of the first embodiment can be obtained.

Figure 5A:
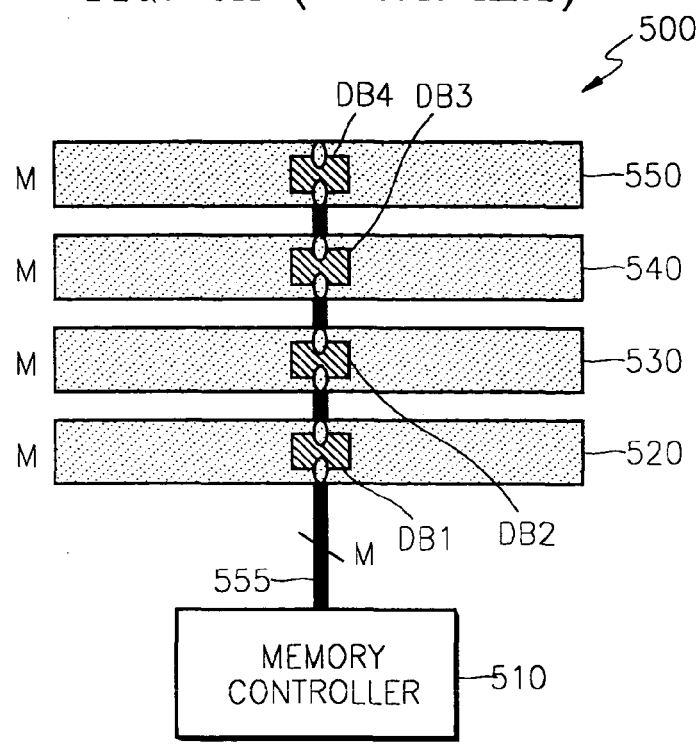
FIG. 5A illustrates a conventional semiconductor memory system employing a serial link bus method.
Figure 5B:
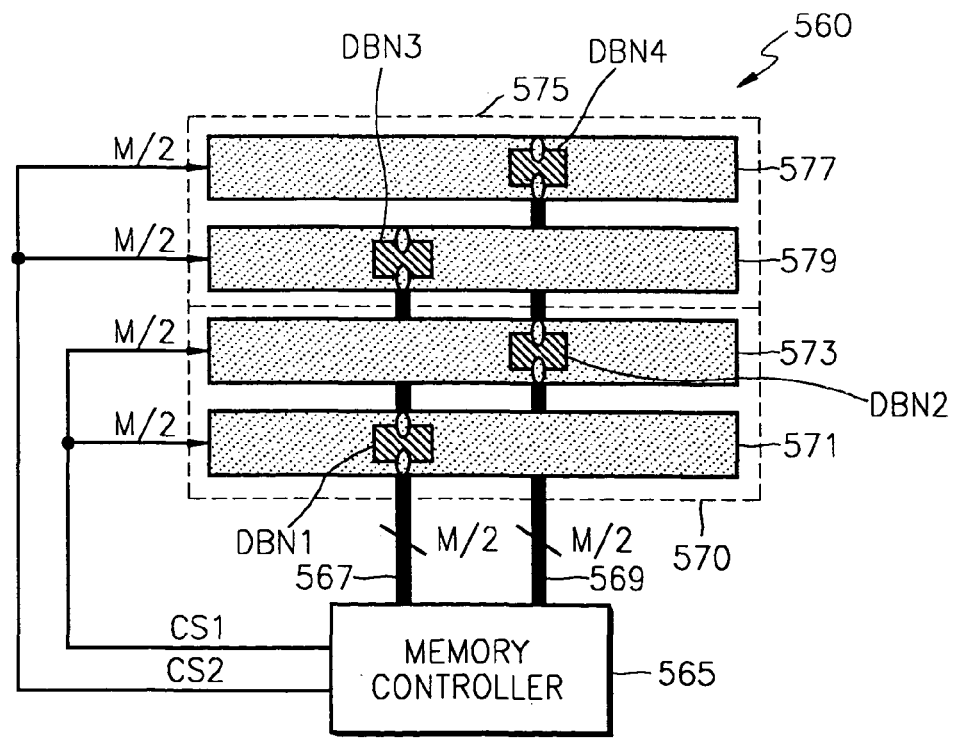
FIG. 5B illustrates a semiconductor memory system employing a serial link bus system according to a third embodiment of the present invention.

FIG. 5A illustrates a conventional semiconductor memory system employing a serial link bus. FIG. 5B illustrates a semiconductor memory system employing a serial link bus according to a third embodiment of the present invention.

Referring first to FIG. 5B, a semiconductor memory system 560 employing a serial link bus according to the third embodiment of the present invention includes a memory controller 565, N system data buses 567 and 569, and first through P-th memory module groups 570 and 575.

The N system data buses 567 and 569 are connected to the memory controller 565, and each of the N system data buses 567 and 569 has the width of M/N bits. Here, M is the width of an entire system data bus of the semiconductor memory system 560. The N system data buses 567 and 569 are wired such that data transmission times are the same from the memory controller 565 to the N memory modules 571, 573, 577, and 579 that operate in response to the same chip select signals CS1 and CS2.

The first through P-th memory module groups 570 and 575 are connected to the N system data buses 567 and 569, and each of the first through P-th memory module groups 570 and 575 includes the N memory modules 571 and 573, and 577 and 579, respectively. In each of the first through P-th memory module groups 570 and 575, a different one of the system data buses 567 and 569 is connected to each of the memory modules 571, 573, 577, and 579, and each of the system data buses 567 and 569 has a data bus width of M/N bits and includes data buffers DBN1, DBN2, DBN3, and DBN4 for data transmission.

The first through P-th memory module groups 570 and 575 are operated in response to corresponding ones of the first through P-th chip select signals CS1 and CS2, and each of the memory modules 571, 573, 577, and 579 connected to the common system data bus transmits data using the data buffers DBN1, DBN2, DBN3, and DBN4.

The L memory devices (not shown) are installed in the N memory modules 571, 573, 577, and 579, with each of the L memory devices having a data bus width of M/(N*L) bits.

Alternately, the L memory devices installed in the N memory modules 571, 573, 577, and 579 may be divided into N banks (not shown), each of the L memory devices having a data bus width of M/L bits. Each of the N banks shares a data bus of M/N bits of the N memory modules 571, 573, 577, and 579 and is separately operated in response to the corresponding chip select signals CS1 and CS2.

Hereinafter, the operation of the semiconductor memory device according to the third embodiment of the present invention will be described in detail with reference to FIGS. 5A and 5B.

The conventional serial link bus of FIG. 5A uses a data transmission technique in which signals are sequentially transmitted from a previous memory module to a next memory module using serial link when memory modules 520, 530, 540, and 550 of the semiconductor memory system 500 are connected to a system data bus 555.

A memory module receives signals from the previous memory module and transmits the signals to the next memory module at a next clock cycle. Such data transmission may be directly performed between memory devices or through an additional data buffer for data transmission.

Since signal transmission in the serial link bus is performed point-to-point between two adjacent memory devices or data buffers, signal fidelity is very high even in high-speed operation.

However, each time data is transmitted to the next memory module, at least one or more clock cycles of time is required for a data buffering operation. Thus, the latency of the semiconductor memory system is increased, reducing the operating speed of the semiconductor memory system.

In particular, in a large-capacity semiconductor memory system, as the number of memory modules is increased, the number of intermediate buffering operations performed is increased. Thus, time delay caused by the intermediate buffering periods is increased, and the speed of the semiconductor memory system is further reduced.

In order solve the above-mentioned problem associated with the arrangement of FIG. 5A, the present invention may be applied to a memory system having a serial link bus as shown by way of example in FIG. 5B.

FIG. 5B illustrates a case where the data bus width of the memory modules 571, 573, 577, and 579 is half of the entire system data bus width. When there are four memory modules, in the conventional semiconductor memory system 500 shown in FIG. 5A, three data buffering operations are needed in transmitting data from the memory module 520 to the memory module 550.

However, in the semiconductor memory system 560 according to the third embodiment of the present invention shown in FIG. 5B, only one intermediate data buffering operation is needed, such that time delay resulting from data buffering is reduced greatly, latency of the semiconductor memory system is reduced and the operating speed of the semiconductor memory system is increased. The structure and operation of the memory modules 571, 573, 577, and 579 of FIG. 5B are the same as those of the memory modules according to the first embodiment, and thus, detailed descriptions thereof will be omitted.

As described above, in the semiconductor memory system according to the present invention, the number of memory modules connected to a system data bus is reduced, such that high-speed operation is achieved while large-capacity memory is maintained.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A semiconductor memory system comprising:
   a memory controller;
   N system data buses connected to the memory controller, each of the N system data buses having a width of M/N bits, where M is a natural number and N is a natural number greater than or equal to 2; and
   first through P-th memory module groups, each of the first through P-th memory module groups having N memory modules, where P is a natural number greater than or equal to 2;
   wherein the N memory modules within each of the first through P-th memory module groups are respectively connected to the N system data buses such that each of the N memory modules within each group is connected to a separate and distinct one of the N system data buses;
   wherein the first through P-th memory module groups are operated in response to respective first through P-th chip select signals; and,
   wherein the N system data buses are wired such that data transmission times between the N memory modules within each of the first through P-th module group and the memory controller are the same.

2. The system of claim 1, wherein M is a bit-width of an entire system data bus of the semiconductor memory system.

3. The system of claim 1, wherein each of the N memory modules includes L memory devices is divided into N banks; and,
   wherein the two or more banks within each of the N memory modules share a data bus of M/N bits and the two or more banks within each of the N memory modules are separately operated in response to two or more corresponding chip select signals.

4. The system of claim 3, wherein the two or more banks within each of the N memory modules respectively receive the two or more corresponding chip select signals.

5. The system of claim 3, wherein each of the L memory devices has a data bus width of M/L bits.

6. The system of claim 1, wherein each of the N memory modules includes L memory devices, and wherein each of the L memory devices has a bus width of M/(N*L) bits.

7. The system of claim 3, wherein each of the L memory devices in each of the N memory modules shares a data pin with at least one other memory device.

8. The system of claim 1, further comprises:
first through P-th data buffers connected to each of the N system data buses.

9. A semiconductor memory system comprising:
a memory controller;
N system data buses connected to the memory controller, each of the N system data buses having a width of M/N bits, where M is a natural number and N is a natural number greater than or equal to 2;
a first memory module group having N memory modules respectively connected to the N system data buses such that each of the N memory modules is connected to a separate and distinct one of the N system data buses, wherein the N memory modules of the first memory module group each have a data bus width of M/N bits and are operated in response to first chip select signals; and
a second memory module group having at least one memory module connected to all of the N system data buses, wherein the at least one memory module of the second memory module group has a data bus width of M bits and is operated in response to a second chip select signal; and,
wherein the N system data buses are wired such that data transmission times between each of the memory modules in the first memory module group and the memory controller are the same.

10. The system of claim 9, wherein M is a bit-width of an entire system data bus of the semiconductor memory system.

11. The system of claim 9, wherein each of the memory modules of the first memory module group includes L memory devices divided into two or more banks, wherein the two or more banks share a data bus of M/N bits and are separately operated in response to the first chip select signals.

12. The system of claim 11, wherein the first chip select signals are respectively applied to the two or more banks.

13. The system of claim 11, wherein each of the L memory devices has a data bus width of M/L bits.

14. The system of claim 9, wherein each of the memory modules includes L memory devices, and each of the L memory devices has a bus width of M/(N*L) bits.

15. The system of claim 11, wherein each of the L memory devices in each of the N memory modules shares a data pin with at least one other memory device.

16. The system of claim 9, further comprises:
first through P-th data buffers connected to each of the N system data buses.

17. A semiconductor memory system, the system comprising:
a memory controller;
N system data buses connected to the memory controller, each of the N system data buses including a plurality of data buffers and having a width of M/N bits, where M is a natural number and N is a natural number greater than or equal to 2; and
first through P-th memory module groups connected to the N system data buses, each of the first through P-th memory module groups having N memory modules, wherein P is a natural number greater than or equal to 2;
wherein the N memory modules within each of the first through P-th memory module groups are respectively connected to the data buffers of N system data buses such that each one of the N memory modules within each group is connected to a separate and distinct data buffer;
wherein the first through P-th memory module groups are operated in response to respective first through P-th chip select signals; and,
wherein the N system data buses are wired such that data transmission times between the N memory modules within each of the first through P-th module groups and the memory controller are the same.

18. The system of claim 17, wherein M is a bit-width of an entire system data bus of the semiconductor memory system.

19. The system of claim 17, wherein each of the memory modules of the first memory module group includes L memory devices;
wherein the L memory devices are divided into two or more banks; and,
wherein the two or more banks of each of the L memory devices share a data bus of M/N bits and are separately operated in response to two or more corresponding chip select signals.

20. The system of claim 19, wherein the two or more banks of each of the L memory devices respectively receive the two or more corresponding chip select signals.

21. The system of claim 19, wherein each of the L memory devices has a data bus width of M/L bits.

22. The system of claim 17, wherein each of the memory modules includes L memory devices, and each of the L memory devices has a bus width of M/(N*L) bits.

* * * * *